US012608073B2

(12) United States Patent (10) Patent No.: US 12,608,073 B2

Ali Akbarian et al. (45) Date of Patent: Apr. 21, 2026

(54) PREDICTING BODY MOTION

(71) Applicant: Microsoft Technology Licensing, LLC, Redmond, WA (US)

(72) Inventors: Mohammand Sadegh Ali Akbarian, Cambridge (GB); Fatemehsadat Saleh, Cambridge (GB); Pashmina Jonathan Cameron, Cambridge (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 421 days.

(21) Appl. No.: 18/164,391

(22) Filed: Feb. 3, 2023

(65) Prior Publication Data

US 2024/0264658 A1 Aug. 8, 2024

(51) Int. Cl.
*G06F 3/01* (2006.01)
*G02B 27/00* (2006.01)
*G06N 3/08* (2023.01)
*G06T 13/40* (2011.01)

(52) U.S. Cl.
CPC .......... *G06F 3/011* (2013.01); *G02B 27/0093* (2013.01); *G06N 3/08* (2013.01); *G06T 13/40* (2013.01)

(58) Field of Classification Search
CPC ....... G06F 3/011; G02B 27/0093; G06N 3/08; G06T 13/40
See application file for complete search history.

(56) References Cited

U.S. PATENT DOCUMENTS

| | | | |
|---|---|---|---|
| 2018/0060666 A1* | 3/2018 | Song | G06N 3/04 |
| 2020/0175713 A1* | 6/2020 | Pescaru | G06V 40/103 |
| 2022/0121878 A1 | 4/2022 | Butler et al. | |
| 2022/0301304 A1 | 9/2022 | Hampali | |
| 2022/0414974 A1 | 12/2022 | Zakharov | |
| 2023/0274492 A1 | 8/2023 | Chen | |

(Continued)

FOREIGN PATENT DOCUMENTS

| | | |
|---|---|---|
| KR | 20140094714 | 7/2014 |
| WO | 2022197367 | 9/2022 |

OTHER PUBLICATIONS

International Search Report and Written Opinion received for PCT Application No. PCT/US2024/013619, May 24, 2024, 14 pages.

(Continued)

*Primary Examiner* — Stephen G Sherman

(74) *Attorney, Agent, or Firm* — Barta Jones, PLLC

(57) ABSTRACT

For each of a plurality of time steps: receive a reference joint pose of an articulated entity and receiving an indication that another joint of the articulated entity is unobserved or observed. Prompt a motion model using the reference joint pose and a mask token. The model predicts body motion comprising a trajectory of the articulated entity and a pose of a plurality of joints of the articulated entity. The mask token represents the other joint and is temporally adaptable by: in response to receiving an indication that the other joint is unobserved, using information about the reference joint pose and a pose of the other joint from a previous time step; and in response to receiving an indication that the other joint is observed, using information about the reference joint pose and a pose of the other joint from the current time step.

20 Claims, 12 Drawing Sheets

(56)                    References Cited

U.S. PATENT DOCUMENTS

2023/0282031 A1*  9/2023  Ali Akbarian ............ G06T 7/75
                                                      382/103
2024/0054671 A1    2/2024  Oreshkin
2024/0265659 A1    8/2024  Ali Akbarian

OTHER PUBLICATIONS

Jiang, et al., "A Dual-Masked Auto-Encoder for Robust Motion Capture with Spatial-Temporal Skeletal Token 2 Completion", In Proceedings of the 45th international ACM SIGIR conference on research and development in information retrieval, Oct. 10, 2022, pp. 5123-5131.

Yuan, et al., "GLAMR: Global Occlusion-Aware Human Mesh Recovery with Dynamic Cameras", IEEE/CVF Conference on computer vision and pattern recognition (CVPR), Jun. 18, 2022, pp. 11028-11039.

Zou, et al., "Snipper: A Spatiotemporal Transformer for Simultaneous multi-Person 3D Pose Estimation Tracking and Forecasting on a Video Snippet", In Repository of arXiv:2207.04320, Jul. 9, 2022, 15 Pages.

"Final IK", Retrieved from: https://web.archive.org/web/20210117200134/https://assetstore.unity.com/packages/tools/animation/final-ik-14290, Jan. 17, 2021, 4 Pages.

Ahuja, et al., "CoolMoves: User Motion Accentuation in Virtual Reality", In Proceedings of the ACM on Interactive, Mobile, Wearable and Ubiquitous Technologies, vol. 5, Issue 2, Jun. 24, 2021, 23 Pages.

Aliakbarian, et al., "FLAG: Flow-Based 3D Avatar Generation from Sparse Observations", In Proceedings of the IEEE/CVF Conference on Computer Vision and Pattern Recognition, Jun. 19, 2022, pp. 13253-13262.

Barron, Jonathan T. , "A General and Adaptive Robust Loss Function", In Proceedings of the IEEE/CVF Conference on Computer Vision and Pattern Recognition, Jun. 16, 2019, pp. 4331-4339.

Biggs, et al., "3D Multi-bodies: Fitting Sets of Plausible 3D Human Models to Ambiguous Image Data", In Proceedings of Advances in Neural Information Processing Systems, vol. 33, 2020, 12 Pages.

Bogo, et al., "Keep It SMPL: Automatic Estimation of 3D Human Pose and Shape from a Single Image", In Proceedings of 14th European Conference on Computer Vision, Oct. 11, 2016, pp. 561-578.

Buttner, Michael, "[Nucl.ai 2015] Motion Matching—The Road to Next Gen Animation ", Retrieved from: https://www.youtube.com/watch?v=z_wpgHFSWss, Aug. 7, 2018, 2 Pages.

Cho, et al., "On the Properties of Neural Machine Translation: Encoder-Decoder Approaches", In Repository of arXiv:1409.1259v1, Sep. 3, 2014, 9 Pages.

Choutas, et al., "Learning to Fit Morphable Models", In Repository of arXiv:2111.14824v1, Nov. 29, 2021, 14 Pages.

Dittadi, et al., "Full-Body Motion from A Single Head-Mounted Device: Generating SMPL Poses from Partial Observations", In Proceedings of the IEEE/CVF International Conference on Computer Vision, Oct. 11, 2021, pp. 11687-11697.

Dosovitskiy, et al., "An Image is Worth 16×16 Words: Transformers for Image Recognition at Scale", In Repository of arXiv:2010.11929v1, Oct. 22, 2020, 21 Pages.

Ghorbani, et al., "SOMA: Solving Optical Marker-Based MoCap Automatically", In Proceedings of the IEEE/CVF International Conference on Computer Vision, Oct. 11, 2021, pp. 11117-11126.

He, et al., "Masked Autoencoders are Scalable Vision Learners", In Proceedings of the IEEE/CVF Conference on Computer Vision and Pattern Recognition, Jun. 19, 2022, pp. 16000-16009.

Holden, et al., "Learned Motion Matching", In Journal of ACM Transactions on Graphics, vol. 39, Issue 4, Jul. 2020, 13 Pages.

Huang, et al., "Deep Inertial Poser: Learning to Reconstruct Human Pose from Sparse Inertial Measurements in Real Time", In Journal of ACM Transactions on Graphics, vol. 37, Issue 6, Nov. 2018, 15 Pages.

Jiang, et al., "AvatarPoser: Articulated Full-Body Pose Tracking from Sparse Motion Sensing", In Proceedings of 17th European Conference Computer Vision, Oct. 23, 2022, pp. 443-460.

Kingma, et al., "ADAM: A Method For Stochastic Optimization", In Proceedings of 3rd International Conference on Learning Representations, May 7, 2015, 15 Pages.

Kingma, et al., "Auto-Encoding Variational Bayes", In Proceedings of 2nd International Conference on Learning Representations, Apr. 10, 2014, 14 Pages.

Kolotouros, et al., "Probabilistic Modeling for Human Mesh Recovery", In Proceedings of the IEEE/CVF International Conference on Computer Vision, Oct. 11, 2021, pp. 11605-11614.

Liu, et al., "On the Limited Memory BFGS Method for Large Scale Optimization", In Journal of Mathematical Programming, vol. 45, Issue 3, Aug. 1989, pp. 503-528.

Loper, et al., "MoSh: Motion and Shape Capture from Sparse Markers", In Journal of ACM Transactions on Graphics, vol. 33, Issue 6, Nov. 19, 2014, 13 Pages.

Loper, et al., "SMPL: A Skinned Multi-Person Linear Model", In Journal of ACM Transactions on Graphics, vol. 34, Issue 6, Nov. 2, 2015, 16 Pages.

Mahmood, et al., "AMASS: Archive of Motion Capture as Surface Shapes", In Proceedings of the IEEE/CVF International Conference on Computer Vision, Oct. 27, 2019, pp. 5442-5451.

Marcard, et al., "Sparse Inertial Poser: Automatic 3D Human Pose Estimation from Sparse IMUs", In Proceedings of Computer graphics forum, vol. 36, Issue 2, May 23, 2017, pp. 349-360.

Nocedal, et al., "Numerical Optimization", In Publication of Springer, Jul. 27, 2006, 686 Pages.

Pavlakos, et al., "Expressive Body Capture: 3D Hands, Face, and Body from a Single Image", In Proceedings of the IEEE/CVF Conference on Computer Vision and Pattern Recognition, Jun. 16, 2019, pp. 10975-10985.

Ponton, et al., "Combining Motion Matching and Orientation Prediction to Animate Avatars for Consumer-Grade VR Devices", In ACM SIGGRAPH/Eurographic Symposium on Computer Animation, vol. 41, Issue 8, Sep. 23, 2022, 12 Pages.

Saito, et al., "PIFuHD: Multi-Level Pixel-Aligned Implicit Function for High-Resolution 3D Human Digitization", In Proceedings of the IEEE/CVF Conference on Computer Vision and Pattern Recognition, Jun. 13, 2020, pp. 84-93.

Saleh, et al., "Probabilistic Tracklet Scoring and Inpainting for Multiple Object Tracking", In Proceedings of the IEEE/CVF Conference on Computer Vision and Pattern Recognition, Jun. 19, 2021, pp. 14329-14339.

Ungureanu, et al., "HoloLens 2 Research Mode as a Tool for Computer Vision Research", In Repository of arXiv:2008.11239v1, Aug. 25, 2020, 7 Pages.

Vaswani, et al., "Attention is All You Need", In Proceedings of Advances in Neural Information Processing Systems, vol. 30, Dec. 4, 2017, 11 Pages.

Winkler, et al., "QuestSim: Human Motion Tracking from Sparse Sensors with Simulated Avatars", In Repository of arXiv:2209.09391v1, Sep. 20, 2022, 9 Pages.

Yang, et al., "LoBSTr: Real-time Lower-Body Pose Prediction from Sparse Upper-body Tracking Signals", In Proceedings of Computer Graphics Forum, vol. 40, Issue 2, May 2021, pp. 265-275.

Yi, et al., "Physical Inertial Poser (PIP): Physics-Aware Real-Time Human Motion Tracking from Sparse Inertial Sensors", In Proceedings of the IEEE/CVF Conference on Computer Vision and Pattern Recognition, Jun. 19, 2022, pp. 13167-13178.

Yi, et al., "TransPose: Real-Time 3D Human Translation and Pose Estimation with Six Inertial Sensors", In Journal of ACM Transactions on Graphics, vol. 40, Issue 4, Aug. 2021, 13 Pages.

Zanfir, et al., "THUNDR: Transformer-Based 3D Human Reconstruction with Markers", In Repository of arXiv:2106.09336v1, Jun. 17, 2021, 11 Pages.

Zanfir, et al., "Weakly Supervised 3D Human Pose and Shape Reconstruction with Normalizing Flows", In Proceedings of 16th European Conference on Computer Vision, Aug. 23, 2020, pp. 465-481.

(56) References Cited

OTHER PUBLICATIONS

Zhang, et al., "We Are More Than Our Joints: Predicting How 3D Bodies Move", In Proceedings of the IEEE/CVF Conference on Computer Vision and Pattern Recognition, Jun. 19, 2021, pp. 3372-3382.

Zhou, et al., "On the Continuity of Rotation Representations in Neural Networks", In Proceedings of the IEEE/CVF Conference on Computer Vision and Pattern Recognition, Jun. 16, 2019, pp. 5745-5753.

International Preliminary Report on Patentability received for PCT Application No. PCT/US2024/013619, mailed on Aug. 14, 2025, 09 pages.

Non-Final Office Action mailed on Nov. 28, 2025, in U.S. Appl. No. 18/403,709, 22 Pages.

* cited by examiner

MOTION MODEL WITH TEMPORALLY ADAPTABLE MASK TOKENS

102

302

304   306

300

112

PREDICTING BODY MOTION

BACKGROUND

Ways of determining motion of the human body are desired for controlling avatars in telepresence, video conferencing and for a variety of applications such as gesture recognition, computer gaming, mixed-reality, virtual reality and others. Similar situations arise for motions of animal bodies or bodies of other articulated entities.

The motion of a body can be expressed as a global trajectory of the body and poses (3D position and orientation) of a plurality of joints of an articulated entity forming the body.

The embodiments described below are not limited to implementations which solve any or all of the disadvantages of known ways of predicting body motion.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

Motion of an articulated entity is predicted from sparse observations such as a reference joint pose (such as a head pose or pelvis pose) and an indication that a second joint (such as a hand, foot or other joint) is unobserved or observed.

In various examples there is a computer-implemented method comprising, for each of a plurality of time steps: receiving a reference joint pose of an articulated entity; receiving an indication that a second joint of the articulated entity is unobserved or observed and prompting a trained generative motion model. The model is prompted using the reference joint pose and a mask token. The model predicts body motion comprising a trajectory of the articulated entity and a pose of a plurality of joints of the articulated entity. The mask token represents the second joint and is temporally adaptable by: in response to receiving an indication that the second joint is unobserved, using information about the reference joint pose and a pose of the second joint from a previous time step; and in response to receiving an indication that the second joint is observed, using information about the reference joint pose and a pose of the second joint from the current time step.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
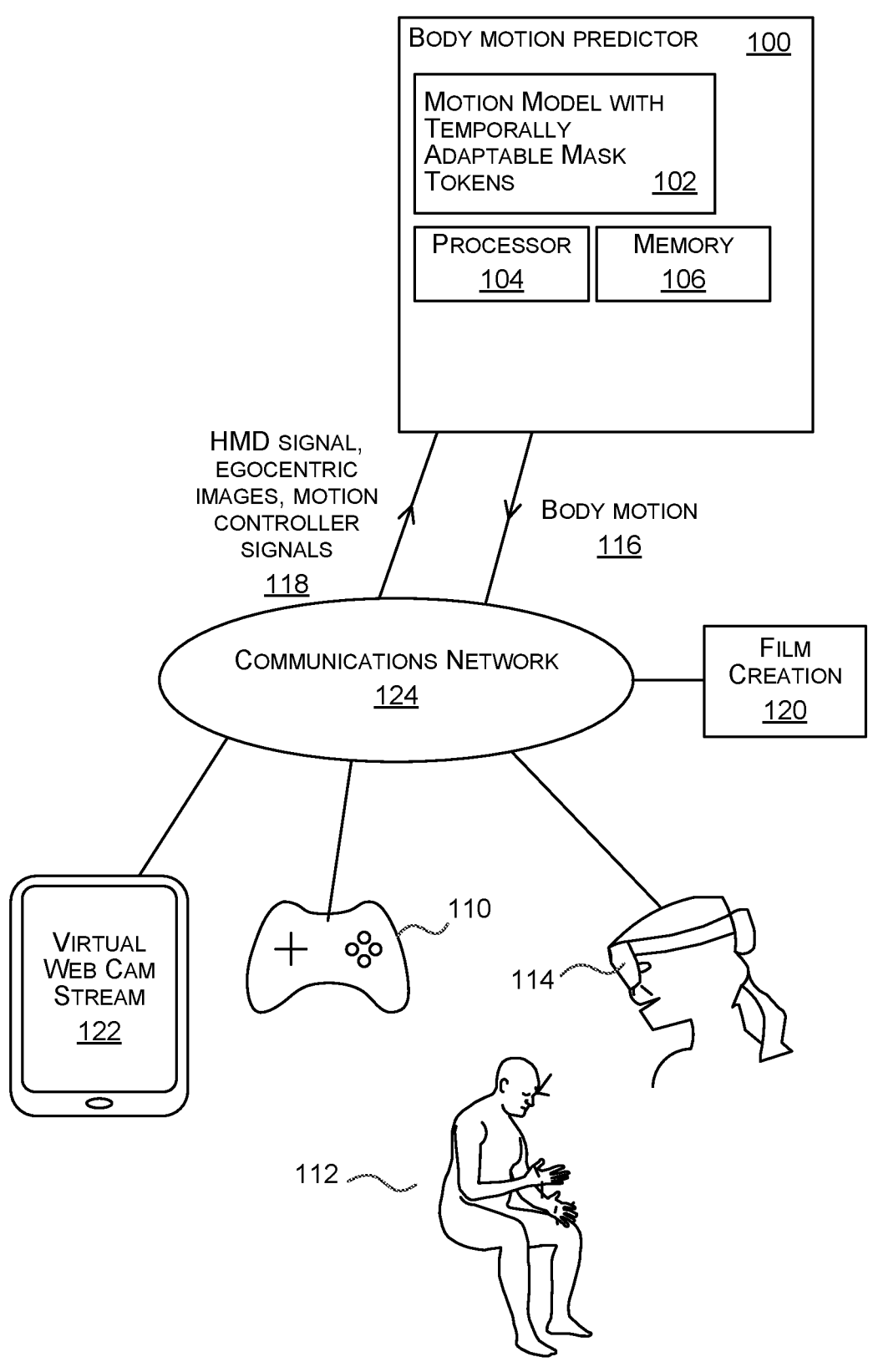
FIG. 1 is a schematic diagram of a generative motion model deployed within a communications network.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Predicting body motion is especially difficult from sparse observations. Consider an articulated entity such as a person, animal, robot, or other articulated entity which is moving and where only sparse observations are available. The sparse observations may be images depicting only part of the articulated entity. The sparse observations may be sensor data from some but not all joints of the articulated entity. The reason for only sparse observations being available are various and comprise factors such as occlusions by other objects in the environment, self-occlusion where part of the articulated entity occludes another part of the articulated entity, restricted field of view of a capture device used to capture the observations, resource constraints such as limited memory available to store observations, limited bandwidth to transfer observations, limited capture device availability or other reasons.

In various examples herein the articulated entity is a person and the capture device is a head mounted display HMD worn by the person. One or more egocentric camera in the HMD capture images of only part of the person due to restricted field of view and occlusions. The person's hands move into and out of the field of view of the egocentric camera. In this scenario it is extremely difficult to predict or compute body motion of the person as the observations are sparse. However, the technology is not limited to HMDs since sparse observations arise in many other scenarios where body motion of an articulated entity is to be computed. In an example, a wall mounted camera in a room may capture images of an animal partially occluded by other objects in the room.

Given only sparse observations of an articulated entity it is desired to compute body motion of the articulated entity. Computing body motion comprises computing full body motion in some examples, which means computing a global trajectory of the body and poses (3D position and orientation) of all specified joints of an articulated entity forming the body. Computing full body motion is useful for animating whole body avatars as opposed to avatars of only part of the body of a user, for example, an upper body or a lower body of a person. The technology described herein may also be used to compute motion of part of a body, such as an upper body or a lower body of a person. Another challenge is to achieve this in real time so that the body motion is usable for downstream tasks including but not limited to: controlling 3D avatars in mixed-reality applications such as telepresence, video conferencing and for a variety of applications such as 3D body gesture recognition, computer gaming, mixed-reality, virtual reality and others.

FIG. 1 is a schematic diagram of a body motion predictor 100 which is computer implemented and comprises a processor 104 and a memory 106. The body motion predictor 100 comprises a motion model 102 with temporally adaptable mask tokens as explained in more detail below.

The body motion predictor 100 is in communication with other entities via communications network 124 such as the internet, an intranet or any other communications network. The body motion predictor receives inputs via the communications network 124. In an example the inputs 118 comprise an HMD signal, egocentric images, motion controller signals, user inputs such as a mouse and/or keyboard input. In the case of user inputs such as a mouse and/or keyboard input, these are used to specify 3D position and/or orientation of one or more joints of the articulated entity. In an example, arrow keys are used to specify a pelvis position and mouse motion determines head and/or torso rotation. More generally, the inputs comprise at least a pose of a reference joint of an articulated entity for which body motion is to be computed, and an indication of whether a second joint of the articulated entity is observed or unobserved in a current time step. There may be more inputs, such as poses of one or more joints in other coordinate spaces, changes in position of joints between time steps, changes in rotation of joints between time steps. The body motion predictor uses the inputs to compute a predicted body motion 116 of the articulated entity. The predicted body motion comprises a global trajectory of the body and poses (3D position and orientation) of a plurality of joints of the articulated entity. In various examples the predicted body motion 116 is computed in real time, that is, at a frame rate similar to that of a downstream operation which uses the predicted body motion 116.

The predicted body motion 116 is used by downstream processes such as a film creation service 120 which is computer implemented and animates a 3D model of the articulated entity according to the predicted body motion 116 in order to create a film. In another example, the predicted body motion 116 is used to animate an avatar of the articulated entity and the animation is inserted into a virtual web cam stream 122. In another example, the predicted body motion 116 is used to influence how a video game proceeds and how a video game is displayed to a user of game controller 110. In another example, the predicted body motion 116 is used to animate a full body avatar 112 of the articulated entity which is visible to a wearer of an HMD 114.

In the example of FIG. 1 the body motion predictor 100 is deployed as a cloud service. However, it is also possible for the body motion predictor 100 to be deployed in an HMD 114 or any other end user device. The functionality of the body motion predictor may be shared between an end user device and a server as appropriate for particular applications.

The motion model with temporally adaptable mask tokens of the disclosure operates in an unconventional manner to enable body motion prediction from sparse observations.

The motion model with temporally adaptable mask tokens improves the functioning of the underlying computing device enabling body motion prediction even from only sparse observations.

Alternatively, or in addition, the functionality of the body motion predictor 100 described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
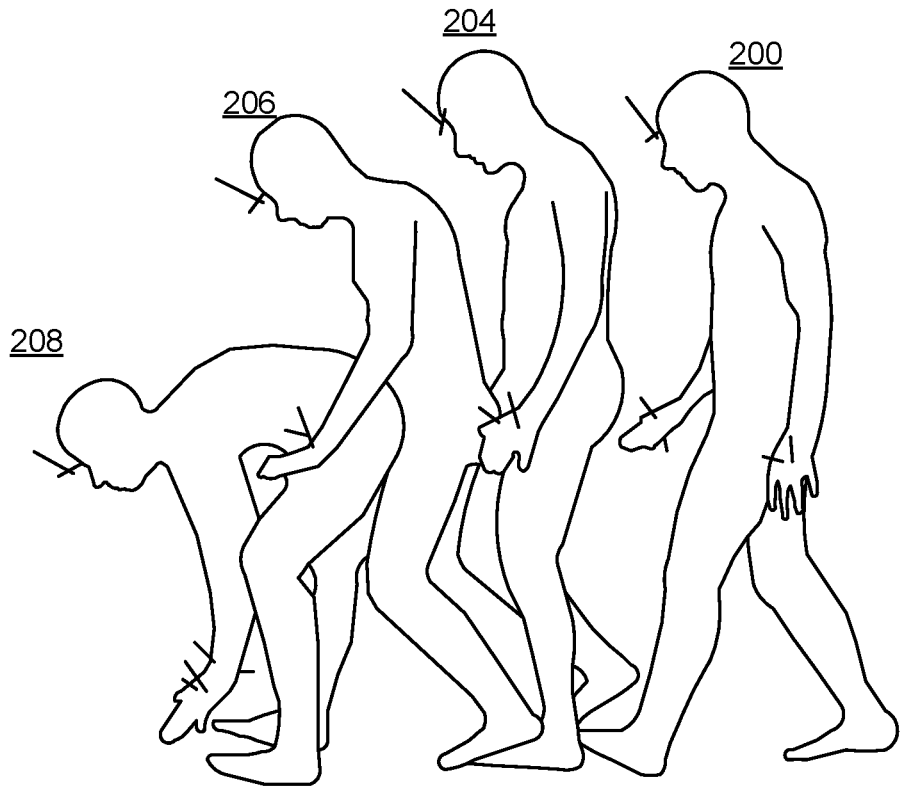
FIG. 2 is a diagram depicting hand tracking of a user in a scenario.

FIG. 2 shows an example of body motion predictions computed by the body motion predictor 100 of FIG. 1 although in FIG. 2 the outline of the body is shown and the joints are not visible. In this example the articulated entity is a person and the motion is the person's motion as they go from a standing position 200 to pick up an object in position 208. As the person goes from position 200 to 208, the poses of the of the person's joints change as indicated by intermediate positions 204 and 206. In FIG. 2, the head is taken to be a reference joint where the pose of the joint is known at all time steps. Each hand of the person is a respective first moving and second moving joint. Where the person holds a motion controller in each hand, the pose of the user's respective hands is known at each time step. However, where observations are sparse, such as where hand tracking is performed on images captured by an egocentric camera, the poses of the respective hands will only be known if they are in a field or view FoV of the egocentric camera. In various examples described herein body motion is predicted even where there are sparse observations, such as a pose of a reference joint and poses of one or more other joints which are sometimes unobserved.

In FIG. 2, where the hand tracking is performed by a HMD worn by the user, it can be seen that at each position of the user from 200 to 208, the hands are in a different position. For example, at position 208, both hands of the user will be in the FoV of the HMD, whilst at position 200, the user's right hand will be in the FoV of the HMD and the user's left hand will be out of the field of view of the HMD. Where a user wears an HMD, the pose of the user's head will be known with certainty as the head pose does not rely on being visible to another device.

Figure 3:
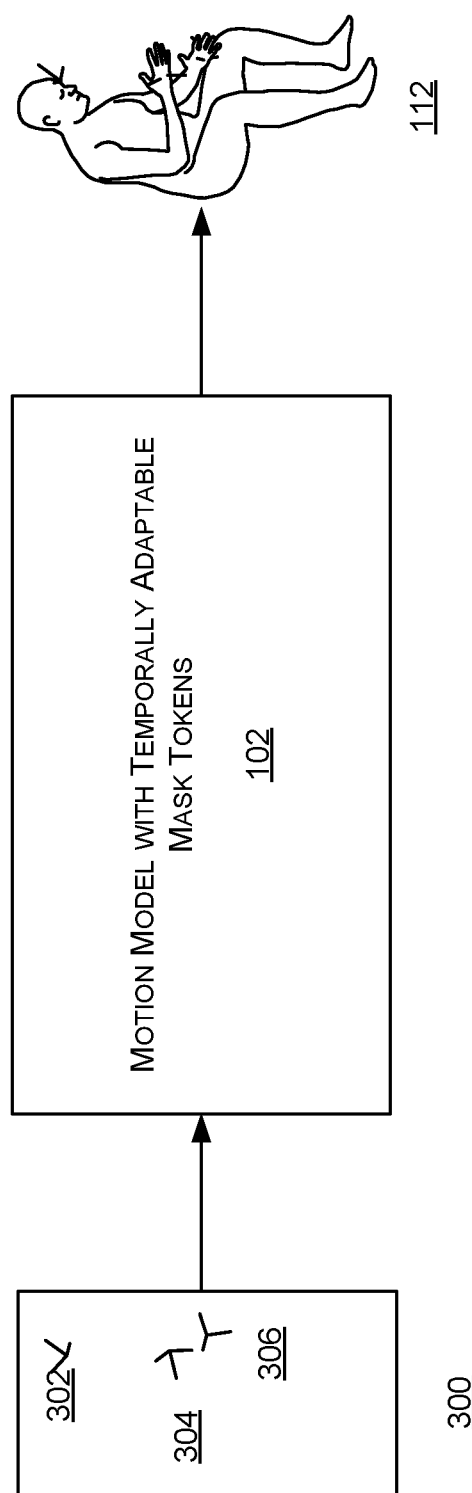
FIG. 3 is a schematic diagram of a generative motion model.

FIG. 3 shows a high level overview of how a body motion estimate is generated. In FIG. 3, poses 300 are input into a motion generation model 102, the motion generation model comprising temporally adaptable mask tokens, and a body motion estimate is generated. The three poses 300 in FIG. 3 are a head pose 302, a left hand pose 304 and a right hand pose 306. The poses are indicated as three axes originating from a point, where the point is a 3D position of a joint and the axes represent an orientation of a joint. However, the methods and systems developed by the inventors enable a body motion estimate to be generated from a reference joint pose, in this case head pose 302, alone. That is, the input poses to the model in some examples comprise a reference joint pose and one, both or no hand poses. A reference joint is any specified joint of an articulated entity which is expected to be observed at generally every time step. In some examples there are additional inputs such as velocities of joints but it is not essential.

As can be seen in FIG. 3, the generation of body motion is shown to be a prediction of the full body motion of the user; thus the pose of all the joints of the user are determined. As used herein, fully body motion comprises motion of the entire body of the user. Whilst prediction of full body motion is depicted in FIG. 3, partial body motion may instead be predicted. For example, the one or more inputs 300 provided to the model 102 may be used to generate body motion for only the upper body of the user.

In the example of FIG. 3 the inputs 300 comprise poses of three joints. However, the motion model is also workable where the inputs 300 comprise a pose of a reference joint and an indication of the absence of one or more other joints of the articulated entity.

The example of FIG. 3 is appliable to other articulated entities such as animals, robots, or articulated entities such as motor vehicles, laptop computers or other articulated entities.

Figure 4:
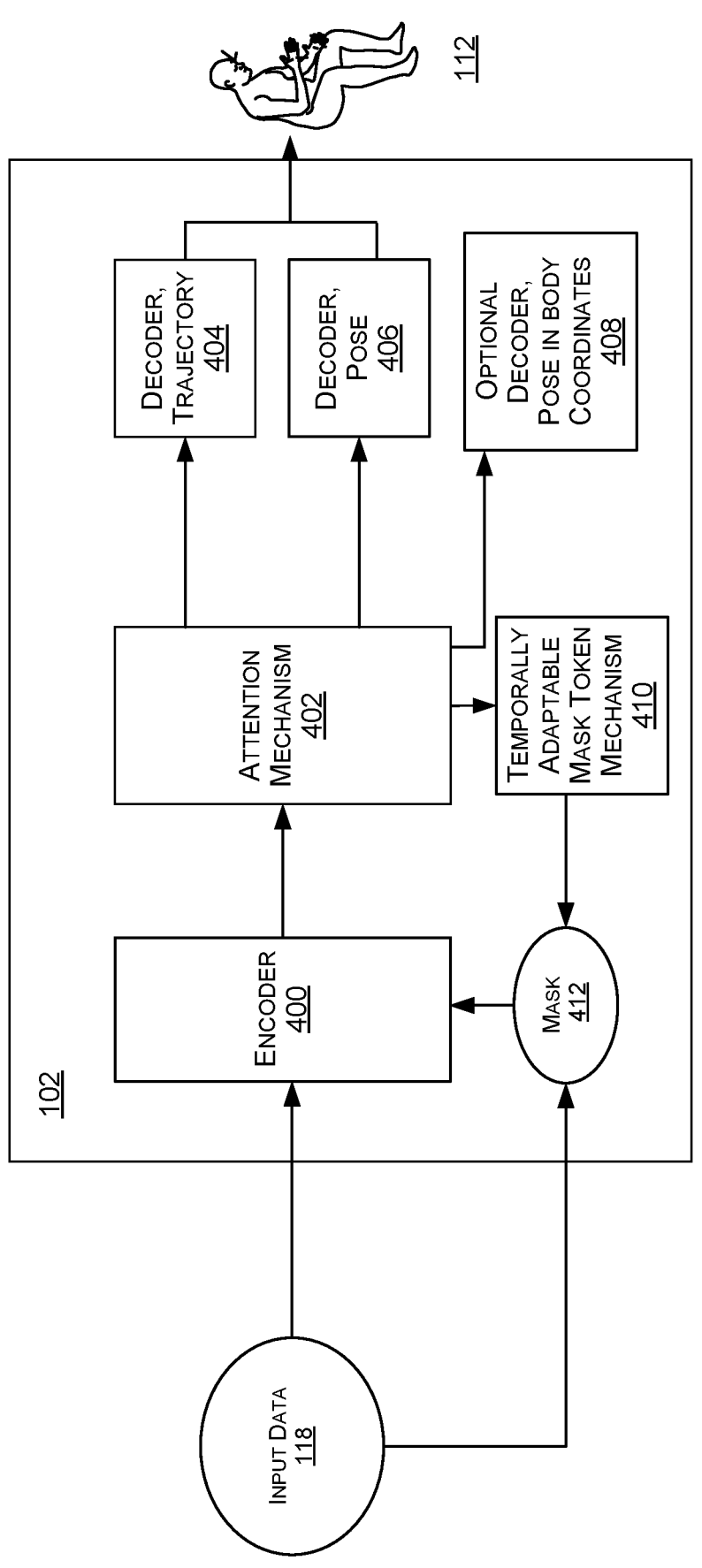
FIG. 4 is a schematic diagram of an example of the generative motion model of FIG. 3 in more detail.

More detail about the motion model 102 is now given with reference to FIG. 4.

As shown in FIG. 4 the motion model 102 comprises an encoder 400, a decoder which is separated into one or more separate decoders 404, 406, an optional decoder 408 used only during training, an attention mechanism 402 and a temporally adaptable mask token mechanism 410.

As mentioned with reference to FIG. 3, input data 118 to the motion model 102 comprises a pose of a reference joint of the entity and an indication of presence or absence of one or more other joints of the entity in a current observation. In the case that the one or more other joints are observed in the current observation the input data 118 includes the pose of the one or more other joints. In some examples the input data 118 may also comprise per joint changes in joint position between time steps, per joint changes in joint rotation between time steps.

The encoder 400 and decoder 404, 406, 408 of the motion model 102 function as for an autoencoder, whereby the input data is encoded into embedding vectors in a multi-dimensional space of relatively high dimension in which input data items which are similar are closer together in the high dimensional space. The embedding vectors are processed by the attention mechanism before being decoded by the decoder 404, 406, to convert the embedding vectors back into poses and a trajectory of the articulated body motion.

Since some of the observations in the input data 118 may be missing a temporally adaptable mask token mechanism 410 is used. The temporally adaptable mask token mechanism operates in the embedding space of the motion model 102 to generate a mask 412. The mask 412 is either an embedding of a pose of a joint observed at the current time step or a predicted embedding of an unobserved joint, predicted by taking into account the embedding of the reference joint and an embedding of the unobserved joint from a previous time step. By using the temporally adaptable mask token mechanism 410 it is possible to achieve high quality body motion prediction despite having input data 118 comprising only sparse observations. By having the temporally adaptable mask token mechanism 410 in the embedding space of the motion model 102 efficiencies are gained; since embedding vectors are a compressed representation of the input data and since a number of encoding and decoding steps is kept low by doing computation within the embedding space.

The inventors have recognized the importance of temporal information when estimating motion. This is because there is a temporal relationship between the pose of a given joint at different times. The temporally adaptable properties of the mask tokens in the present examples, therefore, enable the mask tokens to be updated as shown in FIG. 4, to capture the temporal aspect of the data. This is in contrast to the fixed nature of mask tokens typically used in generative neural networks.

The motion model 102 comprises an attention mechanism 402. The attention mechanism 402 is configured to encode information about the reference joint pose and the pose of one or more other joints of the articulated entity over a plurality of the time steps, and to encode information about spatial correlations between the poses of the joints.

The attention mechanism comprises a transformer neural network. In some cases the attention mechanism comprises only a transformer neural network which is configured to implement both temporal attention and spatial attention. In other examples, the attention mechanism comprises a recurrent neural network and a transformer, where the recurrent neural network enables temporal processing of an input and the transformer enables spatial attention by implementing self-attention. Using both a recurrent neural network and a transformer in the attention mechanism 402 is found to be more efficient than using only a transformer neural network. However, it is possible to use only a transformer neural network and obtain workable results.

In some examples the attention mechanism 402 comprises a gated recurrent unit to encode information about the reference joint pose and a second gated recurrent unit to encode information about a second joint as explained in more detail below. In this case encodings from the gated recurrent units are input to a transformer having a self-attention mechanism as explained in more detail below.

During operation of the motion model 102 to predict body motion (i.e. after the motion model 102 has been trained) the output of the attention mechanism 402 is fed into two decoders. A first decoder is a trajectory decoder 404 which takes part of an embedding vector output of the attention mechanism 402 and decodes it to predict a global trajectory of the motion of an articulated entity. The global trajectory is a matrix transformation of a pose of a reference joint of the articulated entity in world coordinates from a previous time step to the current time step. The second decoder is a pose decoder 406 which is used to decode another part of an embedding vector output of the attention mechanism 402 to predict a global pose of the articulated entity. A global pose of the articulated entity is a pose of each of the joints of the articulated entity in world coordinates.

The motion model 102 has an optional decoder 408 which may optionally be used during training of the motion model 102 and which is not used during use of the motion model 102 (i.e. after training). The optional decoder 408 decodes part of an embedding vector computed by the attention mechanism into a pose of each of the joints of the articulated entity in body coordinates. Body coordinates are coordinates expressed in a coordinate frame of the articulated entity as opposed to a world coordinate frame. The inventors have found that using the pose of the joints in body coordinates during training improves the performance of the resulting motion model 102. However, they have found that repeatedly predicting the pose of the joints in body coordinates at test time (i.e. during use of the motion model 102 after training) then tends to give accumulation of error over time in both the pose and trajectory. Therefore, in various examples the optional decoder 408 is not used at test time.

Figure 5:
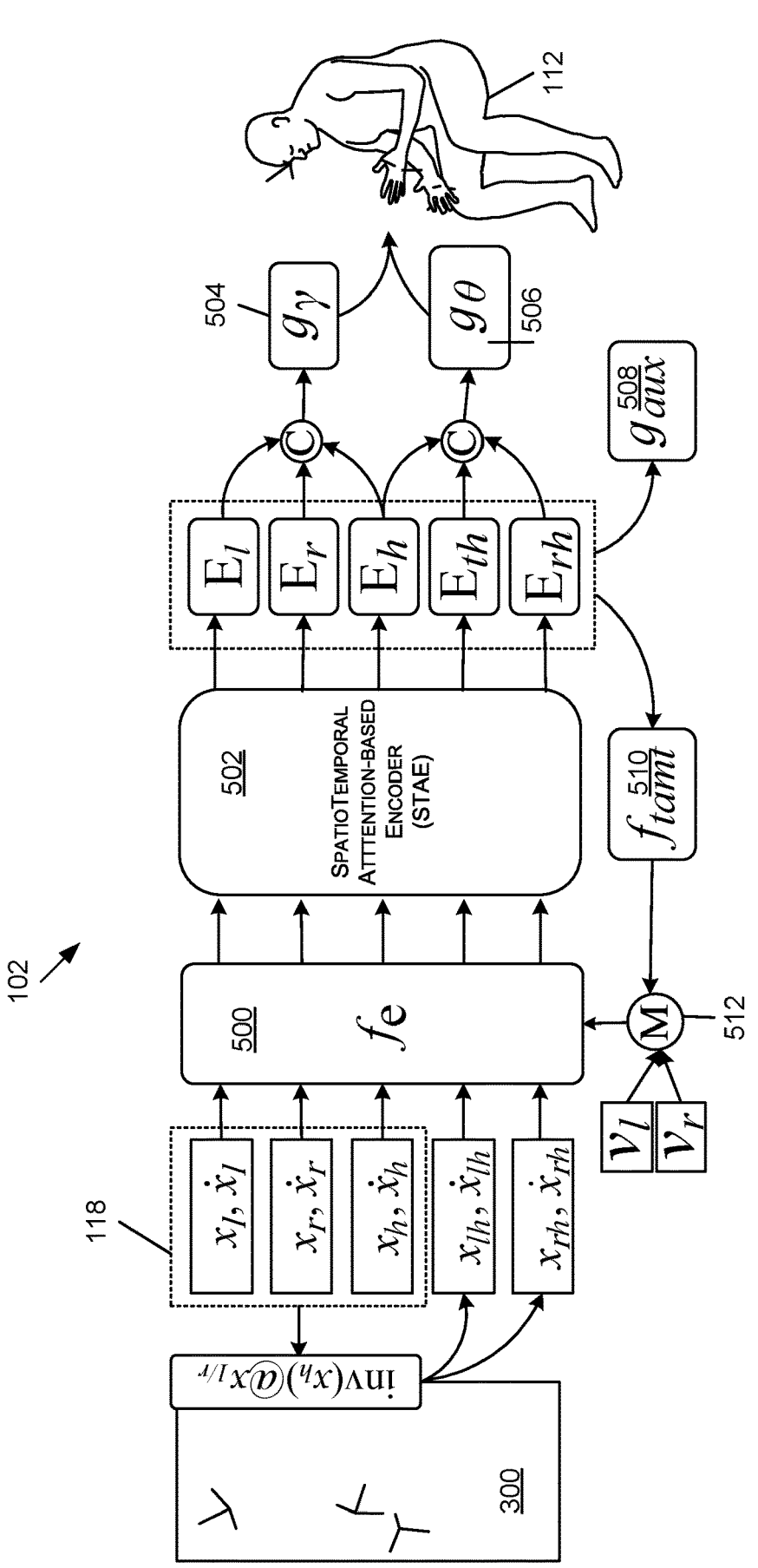
FIG. 5 is a schematic diagram of an example of a generative motion model using input data.

FIG. 5 is a schematic diagram of an example of a generative motion model using input data. The example of FIG. 5 is described with respect to a particular example where the articulated entity is a person, the reference joint is a head of the person, the person is wearing an HMD with an egocentric camera and the HMD processes the egocentric images to achieve hand tracking to track pose of the hands of the person. However, the example of FIG. 5 is also applicable to other scenarios where the articulated entity is an animal or an articulated object such as a motor vehicle, laptop computer, or robot. The reference joint can be any specified joint of the articulated entity which is generally always observable. The other joints of the articulated entity can be any other joints such as feet, knees, or other joints of an articulated entity. Rather than using hand tracking technology it is possible to use the same type of tracking technology to track any joint of an articulated entity.

A task is to generate full-body 3D human locomotion (predicting both the instantaneous pose and the global trajectory of the human) given the sparse HMD signal in an online fashion. That is, given the input signal $x_t$ at each time-step t, the system should predict the 3D human pose and trajectory $y_t$ near-instantaneously. The motion model 102 achieves this using a neural network parameterized by $\phi$.

Consider two scenarios: Motion Controllers (MC) scenario, wherein hands are always tracked via motion controllers using constellation tracking, and Hand Tracking (HT) scenario, wherein hands are tracked via a visual hand tracking system whenever the hands are inside the field of view (FoV) of a capture device. Any suitable commercially available hand tracking technology may be used such as neural network technology which fits images of hands to a 3D hand model. In an example, a hand tracker uses machine learning to initialize a pose of a 3D hand model given captured sensor data depicting the hand. Iterative model-fitting optimization is then used to achieve a detailed pose fit. During iterative model fitting, captured sensor data depicting the hand is fit to the model by finding an update to the pose of the 3D hand model which will result in a close or best match to the observed captured sensor data depicting the hand. The fitting process is repeated iteratively as frames of captured sensor data depicting a moving hand are received. If tracking breaks down due to the hand moving out of the field of view or due to rapid movement of the hand, then machine learning is used to recover a pose of the 3D hand model and then the iterative model fitting continues. In some cases accuracy of hand tracking is improved by using a smooth surface 3D hand model that provide gradients for non-linear optimization. Accuracy is also improved by computing a joint optimization over both the 3D hand model pose and correspondences between observed data points (in captured sensor data depicting the hand) and a surface of the 3D hand model. The FoV of the device may be defined as a frustum determined by an HMD's hand tracking camera placement and parameters. Various examples described herein tackles both MC and HT scenarios within one unified framework. The HT scenario is particularly challenging as hands tend to be out of FoV almost 50% of the time.

In various examples, the input signal $x_t$ contains the head 6-DoF $x_h \in \mathbb{R}$ (6+3), the left hand 6-DoF $x_l^t \in \mathbb{R}$ (6+3), and the right hand 6-DoF $x_r^t \in \mathbb{R}$ (6+3), all in the world space. Examples may use a 6D representation to represent the rotations. The input may optionally include the hand representations in the head space, $x_{lh}^t \in \mathbb{R}$ (6+3) and $x_r^{ht} \in \mathbb{R}$ (6+3). That is, different coordinate systems may be used to express the pose data of the input signal and the input signal may comprise the same pose data expressed in more than one coordinate system. It is not essential to do this. However, the inventors have found some improvement in performance where the pose of one or more joints of the articulated entity are provided in both a coordinate system of the reference joint and a world coordinate system.

In the HT scenario, hands may go in and out of FoV of the HMD, so provide the motion model 102 with hand visibility status for both left and right hand, $v_l^t$ and $v_r^t$, as binary values, 1 being visible and 0 otherwise. Finally, for all 6-DoF signals, provide the velocity of changes between two consecutive frames. Specifically for translations consider vel $(P^t, P^{t-1}) = P^t - P^{t-1} =$ and for rotations consider the geodesic changes in the rotation vel $(R^t, R^{t-1}) = (R^{t-1})^{-1} R^t$ which together constitute the velocity 6-DoF $\dot{x}^t$. Overall, the input to the motion model 102, $x^t \in \mathbb{R}^{92}$, can be written as $$x^t = \{x_h, x_l, \ x_r, \ x_{lh}, \ x_{rh}, \ \dot{x}_h, \ \dot{x}_l, \ \dot{x}_r, \ \dot{x}_{lh}, \ \dot{x}_{rh}, \ v_l, \ v_r\}^t \qquad (1)$$

The output of the motion model 102 comprises the pose (including the root orientation), $\theta^t \in \mathbb{R}^{J \times 3}$ represented with axis-angle rotations for the J joints in the body, and the global position in the world, $\gamma^t \in \mathbb{R}^3$ represented as the root position, resulting in $y^t \in \mathbb{R}^{(J+1) \times 3}$ $$y^t = \{\theta, \gamma\}^t \qquad (2)$$

As referred to herein, a root is the reference joint, such as a pelvis joint or a head joint. As an example, a root is a reference joint which is used as the root of a kinematic tree of a human skeleton. In the case of another type of articulated entity such as a motor vehicle, the root is a joint such as a door hinge, which is specified as a root of a kinematic tree of the articulated entity.

The sequence of $\theta^{0:T}$ and $\gamma^{0:T}$ is the body motion as well as its global trajectory for the period [0, T]. Note that, the time superscript t is dropped for better readability and included when necessary.

With reference to FIG. 5 the motion model 102 receives as input the information about the head and hands in world coordinate system, the hands expressed in the head space, as well as their velocities, as described in Eq. 1. To express hands in head space, consider $x_{lh} = x_h^{-1} x_l$ (similarly, $x_{rh} = x_h^{-1} x_r$). This representation then acts as the input to an embedding layer, $f_e$, 500 which aims to (1) map the raw input to an embedding space and (2) handle the unobserved hands. Given the input $f_e$, the next module, spatio-temporal auto encoder (STAE) 502 (which is an example of the attention mechanism 402), learns (a) how each representation evolves over time and (b) how different components of the input, i.e, head and hands, are correlated. Once such a rich representation is obtained, two auto-regressive decoders, $g_\theta$, 506 and $g_\gamma$, 504 generate the body pose and the global position of the articulated entity, respectively. At each time step, the output of STAE is used to update mask tokens (described below) as a representation for the hand signals that may be missing in the next time-step. To aid training, optionally include an auxiliary task of human pose reconstruction in body coordinates SE(3), denoted by $g_{aux}$ 508.

An embedding module $f_e$ 500 which is an example of the encoder 400 of FIG. 4 gets as input 118 the head and hands 6-DoFs and velocities and maps them to a higher-dimensional embedding space. As the range of values corresponding to the rotations is different from those of the translations, decouple such information and embed them via separate shallow multi layer perceptrons (MLPs) and concatenate the results back together. For instance, for the observed left hand in the world coordinate system, the embedding representation is computed via $$e_l^{visible} = \left[ f_e^R \left( xl[:6] \right), f_e^T(xl[6:]), \; \dot{f}_e^R \left( xl[:6] \right), \dot{f}_e^T \left( xl[6:] \right) \right] \quad (3)$$

where $$f_e^R \text{ and } f_e^T$$

are MLPs responsible for computing the rotation and translation embedding, acting on the first 6 elements the 6D rotation representation) and the last 3 elements (the translation) of the input, respectively (similarly for $$\dot{f}_e^R \text{ and } \dot{f}_e^T.$$

which act on velocities).

In the HT scenario, hands may not be visible to the motion model 102, hence computing such embedding representation is not possible. Thus, given the status of $v_l$ and $v_r$, the embedding module 500 decides to either compute the embedding or utilize the output of the ftamt 510 (described below), a set of temporally adaptable mask tokens, instead of a missing hand observation (denoted by M 512 in FIG. 5).

Figure 6:
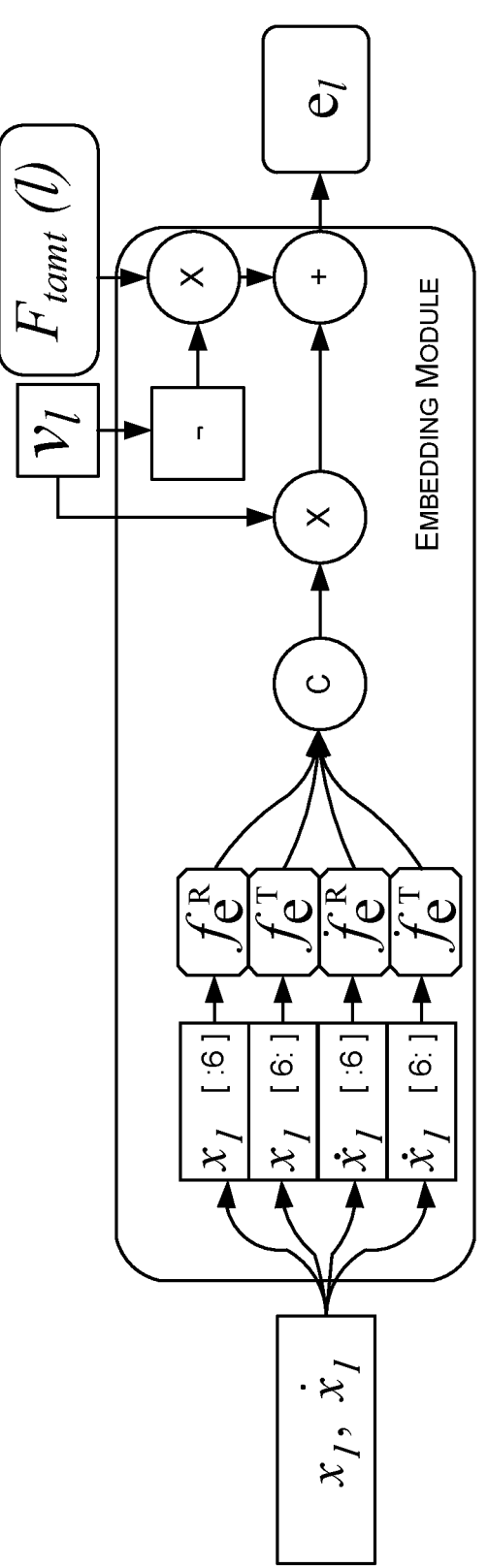
FIG. 6 is a schematic diagram of an encoder.

FIG. 6 shows the embedding module of FIG. 5 in more detail. Note that xl is provided as an example and this module applies to all 6-DoF inputs appearing in $x^t$ as in equation 1. As illustrated in FIG. 6, the embedding of the left hand in the world coordinate system can be computed as $$el = v_l e_l^{visible} + (1 - v_l) \text{ftamt (l).} \quad (4)$$

Figure 7:
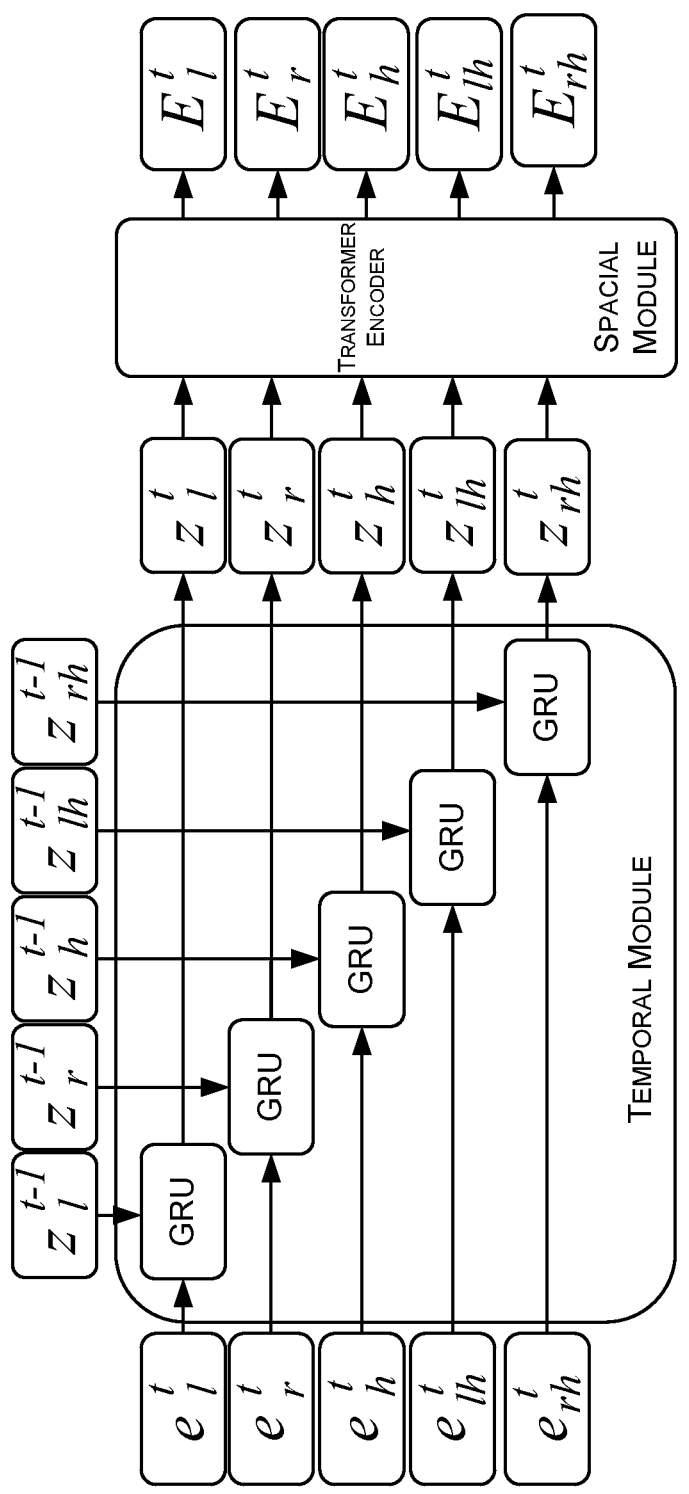
FIG. 7 is a schematic diagram of an attention mechanism.

FIG. 7 shows the spatio-temporal encoder 502 in more detail. The output of $f_e$ on each component of the input stream is a non-temporal feature, computed independent of other components in the input. While an expressive representation of each component, it lacks temporal and spatial correlation information. Temporal and spatial correlation is useful because the motion model 102 is to generate temporally coherent motion and also because the motion of one body part often impacts or determines the motion of other body part(s). To obtain a more informative representation from the head and hands, the motion model 102 first learns the isolated temporal features of each component of input representation and then learns how they are spatially correlated.

To learn the temporal representation of the input signal, the attention mechanism comprises gated recurrent units (GRUs). With a GRU module on top of each component in the input, the model learns how each component, e.g., head, evolves over time, independent of other components in the input. This information is compressed in the hidden state of the GRU cell, z, which is then utilized to learn how different components in the input relate to each other. This is achieved by using a standard transformer encoder on the GRU hidden states, thanks to the self-attention mechanism of the transformer encoder.

Figure 8:
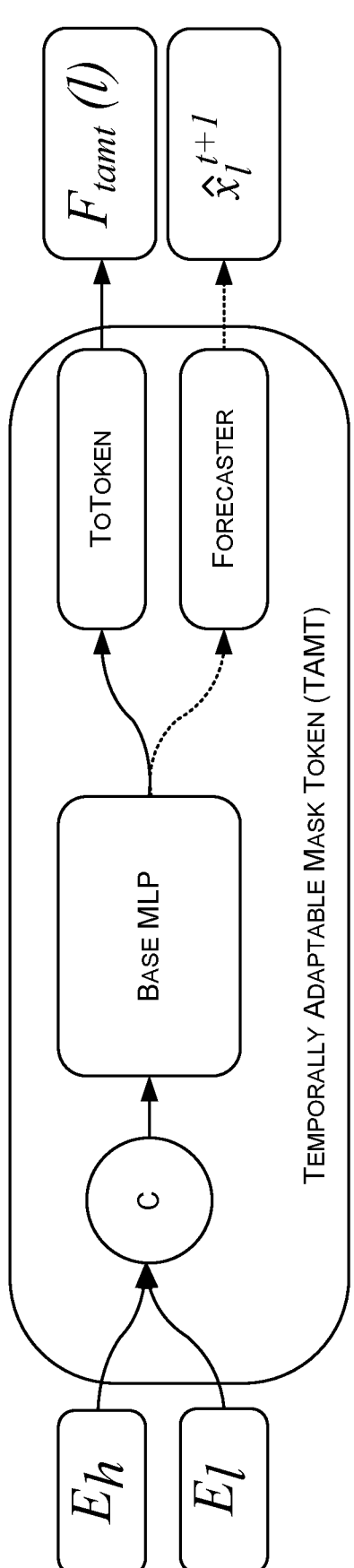
FIG. 8 is a schematic diagram of a temporally adaptable mask token.

FIG. 8 shows more detail of the module 510 which is an example of the temporally adaptable mask token mechanism 410 of FIG. 4. Hands (or other joints) may not be visible to the motion model, and thus, there is no representative input signal for the $f_e$ module 500. To address this issue, in case of a missing hand observation, produce a feature vector, f{tamt}, to represent the missing hand observation. To compute f{tamt}, as illustrated in FIG. 8, use the output of STAE 502 for the hand observation that may be missing in the next time step as well as the output of STAE 502 for the reference joint i.e. head. Note that head joint is the reference joint in this example and is assumed to be available. The combination of these two features is a rich representation of the past state of the missing hand signal (both temporally and spatially); this is then used to compute the f{tamt}. In order to encourage f{tamt} to learn information about the missing hand observation, as illustrated by a Forecaster module in FIG. 8, introduce a forecasting auxiliary task to forecast the state (6-DoF) of the corresponding hand in the next time-step.

Figure 9:
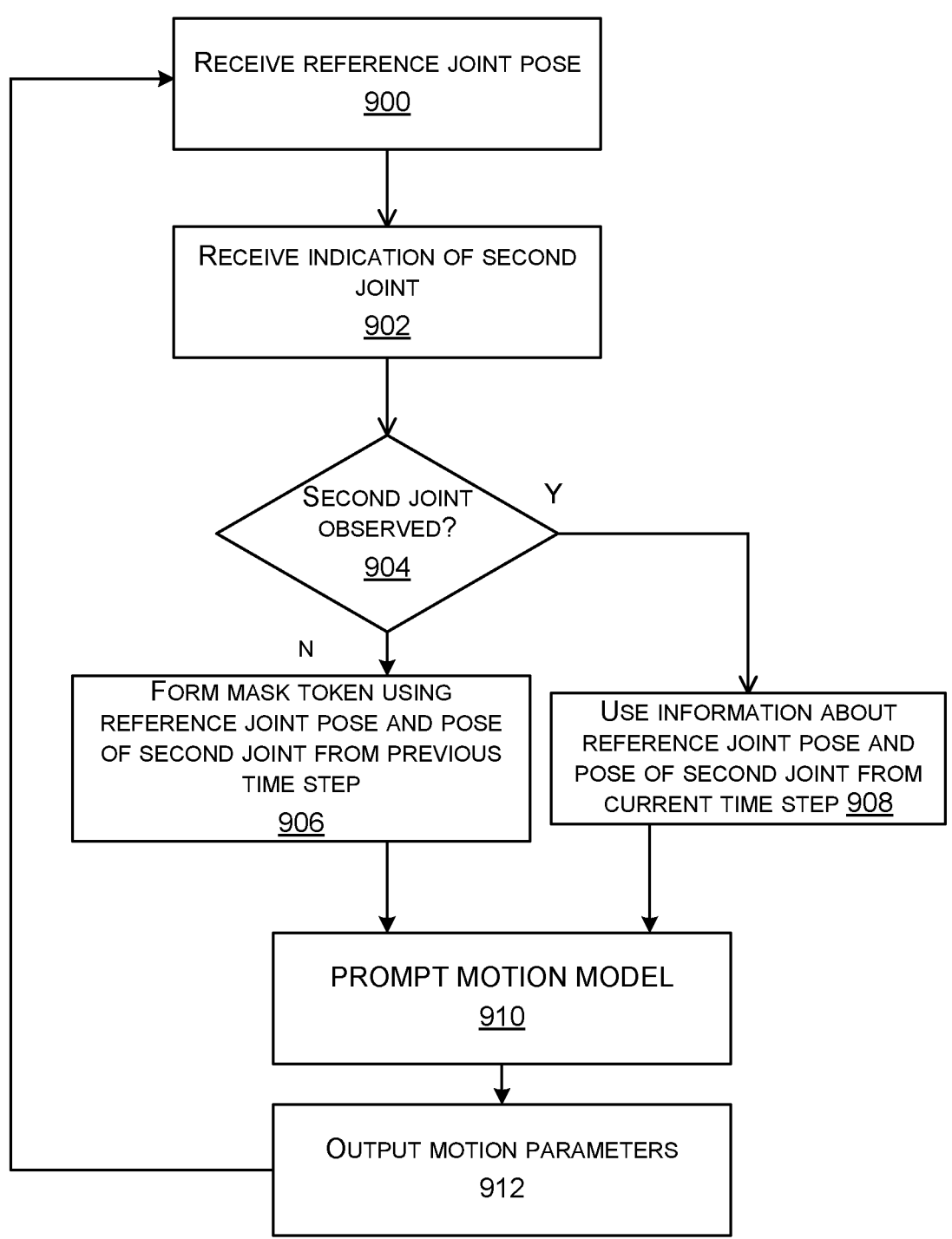
FIG. 9 is flow diagram of a method of predicting body motion.

FIG. 9 is flow diagram of a method of predicting body motion which may be performed by the motion model 102 of any of FIGS. 1 to 5. A body motion predictor receives 900 a reference joint pose of an articulated entity. For example, a pose of a head of a wearer of an HMD. The pose of the head may be known from a sensor such as an accelerometer or global positioning system in the HMD. The pose of the reference joint may be computed by another entity (such as a tracker which tracks pose of joints of articulated entities from depth images or other images) and sent to the body motion predictor.

The body motion predictor receives 902 an indication that a second joint of the articulated entity is unobserved or observed. The indication may be a flag such as a binary value. The indication may be received from another entity such as an image recognition system which recognizes particular joints such as hands, feet or other joints in an image.

The body motion predictor prompts 910 a motion model which is a trained neural network. The prompt comprises a mask token which is a temporally adaptable mask token, as well as the reference joint pose and optionally other information such as poses of other joints, poses of the reference joint or other joints in another coordinate system, changes in 3D position of one or more joints, changes in orientation of one or more joints.

The mask token represents the second joint and is temporally adaptable. In response to receiving an indication that the second joint is unobserved (the negative branch from decision diamond 904), using 906 information about the reference joint pose and a pose of the second joint from a previous time step.

In response to receiving an indication that the second joint is observed (the positive branch from decision diamond 904), using information 908 about the reference joint pose and a pose of the second joint from the current time step.

In the same time step, operations 902 to 910 of the method may be repeated for a third joint. In response to a determination on whether the third joint is observed, a second mask token is temporally adaptable to perform either operations 906 or 908 for the third joint.

Prompting the motion model 910 results in the motion model outputting a prediction which is motion parameters 912 comprising a trajectory of the articulated entity and poses of joints of the articulated entity.

The process of FIG. 9 repeats for another time step and is able to continue so as to track body motion of an articulated entity over time.

Figure 10:
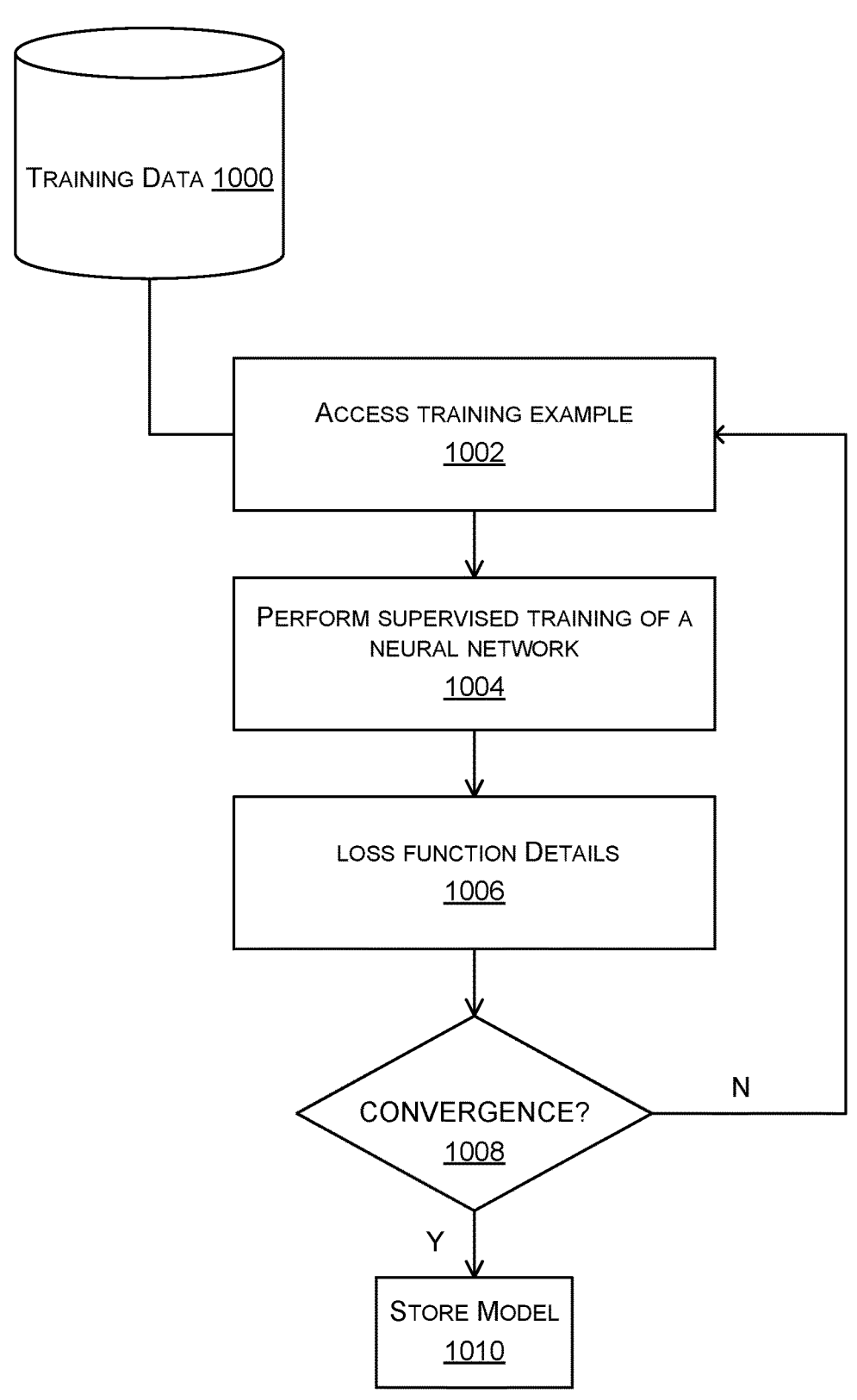
FIG. 10 is a flow diagram of a method of training a generative motion model.

FIG. 10 is a flow diagram of a method of training a generative motion model.

To train the motion generation model, training data 1000 is used comprising labelled training examples; that is each training example comprises known joint poses of an articulated entity which is moving, a known motion trajectory of the articulated entity and simulated inputs to the motion model. The simulated inputs comprise the reference joint pose (this is not simulated as it is assumed to be known), a simulation of an observation of one or more other joints of the articulated entity. The simulated observation takes into account the scenario where the motion model will be used. In an example the simulation uses a field of view of a virtual camera capturing sensor data depicting the moving articulated entity and from which a tracker tracks one or more joints of the articulated entity. The motion of the articulated entity is simulated and thus the simulated observations are computed. The simulated observations have corresponding ground truth body motion values since these are available at the beginning of the process. The ground truth body motion values may be known since they are measured using sensor data, computed from motion capture data, or where the body motion is simulated using a physics engine.

The motion of the articulated entity is simulated at random and within constraints of feasible motion of the articulated entity. The motion of the articulated entity may be simulated according to constraints imposed by a particular environment where the body motion predictor will be used.

Motion capture datasets comprise a sequence of poses. Datasets which may be used are publicly available datasets (such as Archive of Motion Capture As Surface Shapes (AMASS) (trade mark)), empirically obtained datasets and/or synthetically generated datasets. These datasets are represented as Skinned Multi-Person Linear Model (SMPL) parameters (pose, shape, and global trajectory). For each sequence, a capture device with a partial view of the articulated entity is simulated such as an HMD on a subject. In the case of hand or other joint tracking, a FoV frustum is also generated to be able to model the hand or other joint visibility status ($v_l$ and $v_r$).

To synthesize the HMD scenario, global transformation matrices for the head and hands as input are computed. In the case of hand tracking, a FoV for the HMD is defined and the hands are masked out whenever they are out of the FoV.

To train the motion generation model any suitable neural network training algorithm is used such as back propagation.

In examples where the reference joint is the head, the model optimizes the upper body pose parameters as well as the global root trajectory. This is because the observations (head and hands) represent upper body only.

Once the training data is available, a training example is accessed 1002 and used to perform supervised training 1004 of a neural network. The supervised training is of a standard form and uses a loss function with details 1006 as now explained. A check is made at decision point 1008 whether convergence has been reached by examining criteria such as a specified number of training examples having been processed, an amount of change in weights of the neural network being below a threshold or other criteria. If convergence is reached the model is stored 1010 otherwise another training example is accessed 1002.

In an example, the model is then trained on this data with a loss function of the form:

$$\mathcal{L} = \alpha_{data}\mathcal{L}_{data} + \alpha_{smooth}\mathcal{L}_{smooth} + \alpha_{SE\,(3)}\mathcal{L}_{SE\,(3)} + \alpha_{forecast}\mathcal{L}_{forecast} + \alpha_{aux}\mathcal{L}_{aux}.$$

In various examples, the parameter $\alpha$ is set to 1.

However, it is not essential to use all the terms in the above loss function. The data loss term is used and may be used alone or with one or more of the other terms.

The data loss term is the squared error between the predicted pose and trajectory and those of the ground truth motion:

$$\mathcal{L}_{data} = \sum_{t=1}^{T}\left\|\hat{\theta}^t - \theta^t\right\|_2^2 + \left\|\hat{\gamma}^t - \gamma^t\right\|_2^2$$

Here, the total data loss term $\mathcal{L}_{data}$ is the sum of time steps t from the first time step to a time step T of the squared error between the predicted and ground truth motion for the pose and trajectory respectively, where $\hat{\theta}^t$ is the predicted pose, $\theta^t$ is the ground truth pose, $\hat{\gamma}^t$ is the predicted trajectory and $\gamma^t$ is the ground truth trajectory.

In various examples, the pose decoder has two heads, one each for predicting the body pose and the global root orientation. One head predicts the global rotation of the user and the other head predicts the rest of joints relative to the root joint. That is, it predicts the joint angles in the kinematic tree of the human body.

To further enhance the temporal smoothness, the discrepancy between the velocity of changes in the prediction to that of the ground truth is penalized:

$$\mathcal{L}_{smooth} = \sum_{t=2}^{T}\left\|\delta\hat{\theta}^t - \delta\theta^t\right\|_1 + \left\|\delta\hat{\gamma}^t - \delta\gamma^t\right\|_1,$$

where $\delta\hat{\theta}^t = \hat{\theta}^t - \hat{\theta}^{t-1}$ ($\delta\hat{\gamma}$, $\delta\theta$, and $\delta\gamma$ follow similarly). $\mathcal{L}_{smooth}$ is a term which penalises a discrepancy between velocity of changes in the prediction and corresponding values from the training data. Similarly to the above, $\hat{\theta}^t$ is the predicted pose, $\theta^t$ is the ground truth pose, $\hat{\gamma}^t$ is the predicted trajectory and $\gamma^t$ is the ground truth trajectory. t is a given time step and t−1 is a previous time step. Whilst $\mathcal{L}_{smooth}$ is depicted as calculating the $\delta$ with respect to an immediately preceding time step, it is appreciated that the previous time step used for the purposes of calculating data terms herein need not be immediately preceding a current time step.

In addition to computing the reconstruction loss on the SMPL parameters, i.e., to relative joint rotations, it is beneficial to also utilize the reconstruction loss of each joint transformation independent of its parent, i.e., in the world space.

To compute this reconstruction loss, the SMPL model is used to compute the joint transformations in SE(3) given the predicted and ground truth pose and trajectory parameters. Thus, the SE(3) reconstruction loss is be written as:

$$L_{SE(3)} = \sum_{t=1}^{T}\left\|\hat{P}^t_{SE(3)} - P^t_{SE(3)}\right\|_2^2,$$

where $$\hat{P}^t_{SE(3)}$$

is the predicted body pose in SE(3) at a given time step t, where $$\hat{P}^t_{SE(3)}$$

is the body pose in SE(3) at a given time step t and wherein an SE(3) transformation is a homogeneous transformation matrix consisting of a translation and rotation in 3-D. The SE(3) loss term is taken to be a loss in world space.

The forecast loss term corresponds to the forecasting auxiliary task in the TAMT module 510, where the goal is to minimize the distance between the predicted next other joint and the ground truth next other joint:

$$L_{forcast} = \sum_{t=2}^{T} \sum_{j \in \{l,r\}} \left\| \hat{x}^t_j - x^t_j \right\|^2_2.$$

In the forecast loss term $L_{forecast}$, j corresponds to another joint of the articulated entity. For example, there may be two other joints, such as a first hand and a second hand. In $L_{forecast}$, it is assumed that a first other joint of the articulated entity is a left hand, l, and a second other joint of the articulated entity is a right hand, r. The squared error is the distance between the predicted other joint $$\hat{x}^t_j$$

and the ground truth other joint $$x^t_j,$$

for each other joint l, r.

The loss term for the auxiliary task aims to minimize the predicted full body joint transformations from the STAE module's feature representations, $P_{aux}$, to the ground truth body joint transformations:

$$L_{aux} = \sum_{t=1}^{T} \left\| \hat{P}^t_{aux} - P^t_{SE(3)} \right\|^2_2.$$

$L_{aux}$ minimizes the difference between predicted joint transformations of all joints of the articulated entity and corresponding values known from the training data. The auxiliary loss term is the square of the error between the predicted full body joint transformations $$\hat{P}^t_{aux},$$

obtained from the STAE module, and the body pose in SE(3), $$P^t_{SE(3)}.$$

Figure 11:
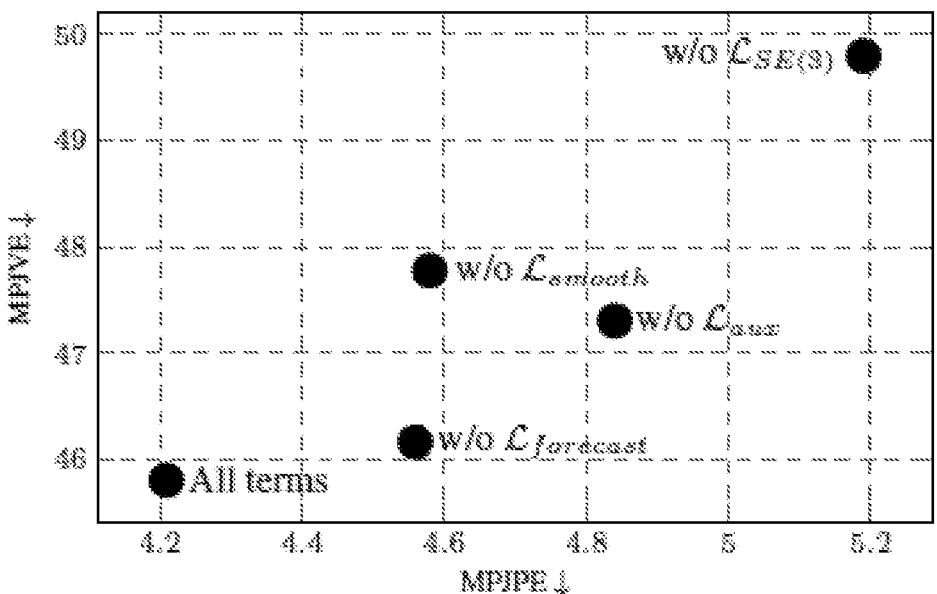
FIG. 11 is a graph of mean per-joint position error against mean per-joint velocity error.

FIG. 11 illustrates the effect of removing each of the terms from the loss function used to train the motion generation model on the mean per-joint position error (MPJPE) and the mean per-joint velocity error (MPJVE). The terms $\alpha_{aux} \mathcal{L}_{aux}$, $\alpha_{smooth} \mathcal{L}_{smooth}$ and $\alpha_{SE(3)} \mathcal{L}_{SE(3)}$ are all optional.

As described above, the motion generation model is trained using a motion capture dataset and a plurality of loss terms, some of which are optional. The motion capture dataset may be represented as SMPL parameters (pose, shape and global trajectory). To assess the contribution of each loss term to the MPJPE and the MPJVE, an ablation experiment was performed and the results are shown in FIG. 11. A motion capture dataset AMASS was split into two portions, a training portion and a testing portion.

The initial motion generation model was trained on the training portion of the motion capture dataset in a leave-one-term-out manner for the plurality of loss terms and using all five loss terms $\mathcal{L}$. The training was done using the Adam optimizer with a batch size of 256 and a learning rate of $1e^{-3}$. The model was trained with sequences of length 40 frames, however, the model may be trained to generate sequences of arbitrary length at inference time. To optimize the model's prediction, a limited-memory Broyden Fletcher Goldfarb Shanno (BFGS) optimizer may be used, with a history size of 10, learning rate of 1, and Strong-Wolfe line search function.

Thus, in the experiment, the initial model, M, was trained on the training portion of the motion capture dataset to provide the following trained motion capture models: $M_{\mathcal{L}}$, $M_{w/o \, \mathcal{L}_{smooth}}$, $M_{w/o \, \mathcal{L}_{aux}}$, $M_{w/o \, \mathcal{L}_{forecast}}$ and $M_{w/o \, \mathcal{L}_{SE(3)}}$, where $M_{\mathcal{L}}$ is the initial model M as trained on all loss terms $\mathcal{L}$, $M_{w/o \, \mathcal{L}_{smooth}}$ is the initial model M as trained on all loss terms $\mathcal{L}$ without $\mathcal{L}_{smooth}$, $M_{w/o \, \mathcal{L}_{aux}}$ is the initial model M as trained on all loss terms $\mathcal{L}$ without $\mathcal{L}_{aux}$, $M_{w/o \, \mathcal{L}_{forecast}}$ is the initial model M as trained on all loss terms $\mathcal{L}$ without $\mathcal{L}_{forecast}$ and $M_{w/o \, \mathcal{L}_{SE(3)}}$ is the initial model M as trained on all loss terms $\mathcal{L}$ without $\mathcal{L}_{SE(3)}$. The loss term $\mathcal{L}_{data}$ is important for training the initial model M and thus is not ablated from the loss term $\mathcal{L}$.

Each of the trained models $M_{\mathcal{L}}$, $M_{w/o \, \mathcal{L}_{smooth}}$, $M_{w/o \, \mathcal{L}_{aux}}$, $M_{w/o \, \mathcal{L}_{forecast}}$ and $M_{w/o \, \mathcal{L}_{SE(3)}}$ was tested on the testing portion of the motion capture and the respective MPJPE and MPJVE calculated. The respective MPJPE and MPJVE obtained using each trained model is shown in FIG. 11.

As can be seen in FIG. 11, the overall error is smallest when all five loss terms are present. $\mathcal{L}_{smooth}$ has a significant impact on improving the MPJVE, while $\mathcal{L}_{aux}$ improves the MPJPE, and $\mathcal{L}_{forecast}$, which acts only on other joints, such as one or more hand joints or one or more foot joints, mildly improves MPJPE and MPJVE. The contribution of $\mathcal{L}_{forecast}$ to the total error metric is relatively small as it acts on a significantly fewer joints. $\mathcal{L}_{SE(3)}$ makes the largest contribution to the reduction of error in both metrics. SE(3) aims to bridge that gap between the representation of the input signal (head and other joint global transformation matrices) and the representation of the output pose (global root orientation and relative joint rotations).

Once trained, the motion generation model is capable of generating high fidelity and plausible human motion given only the HMD signal. However, it is the case with the majority of learning-based approaches that the direct prediction of the neural network may not precisely match the observations i.e., the reference joint and other joint(s), even if it is perceptually quite close.

To reduce the difference between the prediction and the observation, optimization may be used. The goal of the optimization is to optimize the pose parameters such that an energy function is minimized. The energy function may be of the form $\varepsilon=\varepsilon_{data}+\varepsilon_{reg}$, where $\varepsilon_{data}$ is the energy term that minimizes the distance between the predicted reference joint and other joint(s) to the observed ones, and $\varepsilon_{reg}$ is additional regularization term(s). To define the data energy term, the residual is defined as $\mathcal{R}=\Sigma_{j\in\{h,l,r\}}(x_j-\hat{x}_j)$, i.e., the difference between the predicted reference/other joint to that of the observation.

Given $\mathcal{R}$, a typical, non-robust data energy term may be written as:

$$\varepsilon_{nr}=\mathcal{R}^2, \text{ i.e. the } L2 \text{ loss.}$$

This energy term is well-suited to the motion controller scenario, where the reference joint, left hand and right-hand poses are always available. However, this energy term may be misleading in the hand tracking scenario where hands often go into and out of the FoV.

As an example, the right hand may be out of FoV of an HMD for a relatively long period of time up to time t and the model has predicted what the right arm motion could be like for this period. Then, at time t, the right hand comes back to the FoV and there is an observed right-hand signal. While the motion generated by the model is plausible, the predicted right hand may end up in a completely different location from the newly observed right hand.

If the non-robust energy term above is used to minimize the total energy during optimization, there is an abrupt jump in the right arm pose from time t−1 to time t. While this guarantees high fidelity, i.e., hands in the correct position once observed, it adversely affects the perceptual experience of generating temporally smooth and coherent motion.

To remedy this issue, the inventors have recognized the need to utilize a more robust alternative to the data energy term:

$$\varepsilon_r(\mathcal{R},a,b,c)=b\frac{|a-2|}{a}\left(\left(\frac{\left(\frac{\mathcal{R}}{c}\right)^2}{|a-2|}+1\right)^{\left(\frac{a}{2}\right)}-1\right),$$

where a, b, and c are hyper-parameters that determine the shape of the loss.

$\varepsilon_r$ considers large discrepancies between the prediction and observation as outliers without penalizing the prediction strongly and does not push the prediction to move toward the observation. Thus, abrupt changes in the arm poses are avoided and optimization stays on course despite large variation in the velocity metric (when caused by hand visibility changes). While this approach adversely affects the fidelity, a trade-off between the plausibility and fidelity may be chosen to suit the application of interest. Thus it is possible to reduce the influence of discrepancies larger than a threshold value.

Where observations relate to the upper body, during optimization only the upper body pose parameters and global root trajectory are optimized, while keeping the predicted lower body untouched.

Figure 12:
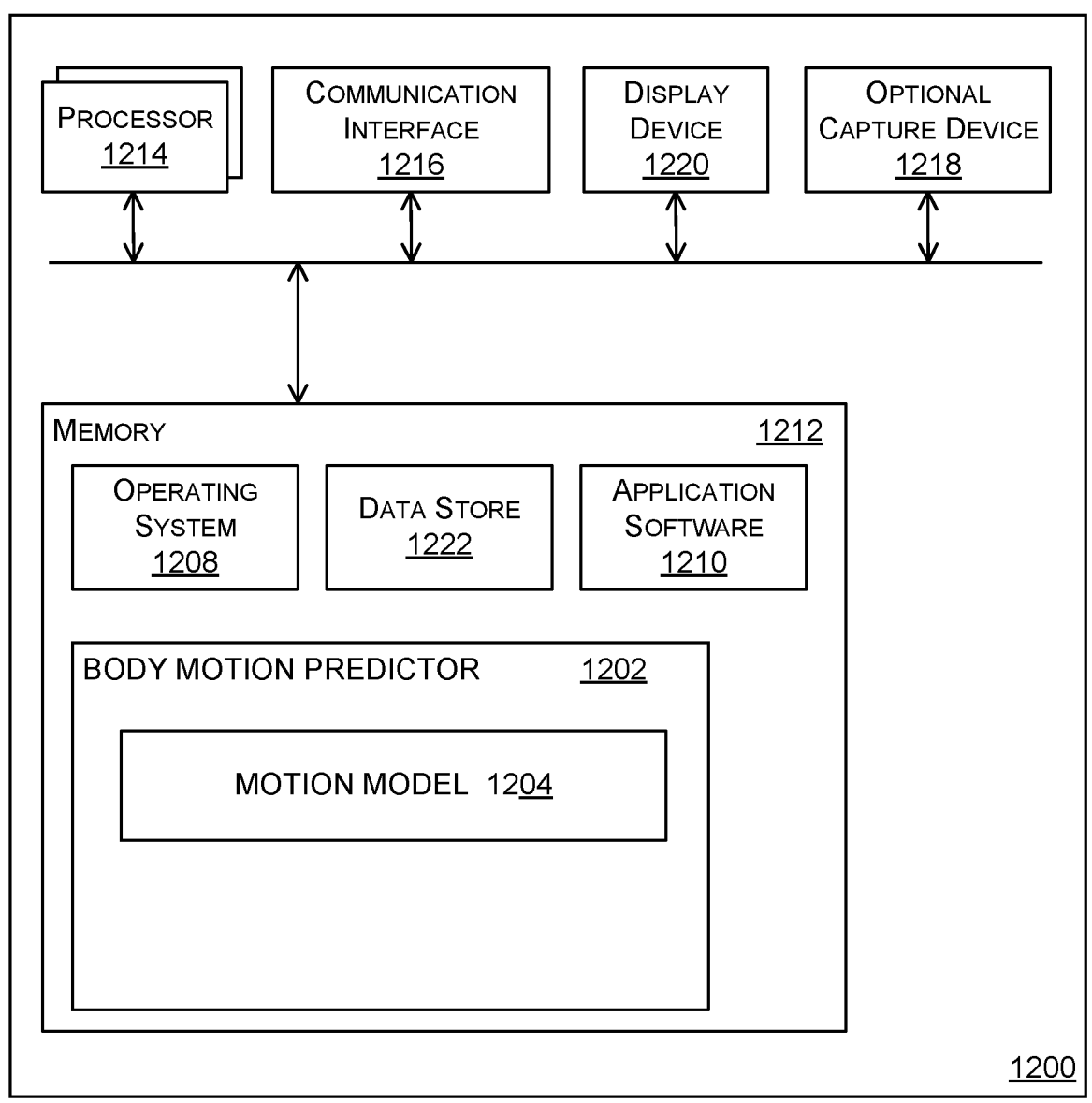
FIG. 12 illustrates an exemplary computing-based device in which methods and systems of body motion prediction are implemented.

FIG. 12 illustrates various components of an exemplary computing-based device 1200 (such as an HMD, cloud server, compute node, virtual machine) which are implemented as any form of a computing and/or electronic device, and in which examples of a body motion predictor 1202 comprising a motion model 1204 are implemented.

Computing-based device comprises one or more processors 1214 which are microprocessors, controllers or any other suitable type of processors for processing computer executable instructions to control the operation of the device in order to execute a motion model with temporally adaptable mask tokens. In some examples, for example where a system on a chip architecture is used, the processors 1214 include one or more fixed function blocks (also referred to as accelerators) which implement a part of the method of executing or generating a motion model with temporally adaptable mask tokens in hardware (rather than software or firmware). Platform software comprising an operating system 1208 or any other suitable platform software is provided at the computing-based device to enable application software 1210 to be executed on the device.

The computer executable instructions are provided using any computer-readable media that is accessible by computing-based device 1200. Computer-readable media includes, for example, computer storage media such as memory 1212 and communications media. Stored in the memory 1212 is an operating system 1208, a data store 1222 and application software 1210. The application software 1210 may comprise telepresence software, avatar animation software, gesture recognition software, virtual reality applications, mixed-reality applications or other downstream applications using outputs of the body motion predictor 1202. The data store 1222 holds pose data, tracking data, velocities, egocentric images, predicted body motion and other data.

Computer storage media, such as memory 1212, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1212) is shown within the computing-based device 1200 it will be appreciated that the storage is, in some examples, distributed or located remotely and accessed via a network or other communication link (e.g. using communication interface 1216).

The computing-based device 1200 also comprises an input/output controller arranged to output display information to a display device 1220 which may be separate from or integral to the computing-based device 1200. The display information may provide a graphical user interface. The input/output controller is also arranged to receive and process input from one or more devices, such as a user input device (e.g. a mouse, keyboard, camera, microphone or other sensor). In some examples the user input device detects voice input, user gestures or other user actions and provides a natural user interface (NUI). In an embodiment the display device 1220 also acts as the user input device if it is a touch sensitive display device. The input/output controller outputs data to devices other than the display device in some examples, e.g. a locally connected printing device.

There is an optional capture device 1218 such as an egocentric camera in some examples.

Alternatively or in addition to the other examples described herein, examples include any combination of the following clauses:

Clause A. A computer-implemented method comprising, for each of a plurality of time steps:

receiving a reference joint pose of an articulated entity;

receiving an indication that a second joint of the articulated entity is unobserved or observed;

prompting a trained generative motion model using the reference joint pose and a mask token to predict body motion comprising a trajectory of the articulated entity and a pose of a plurality of joints of the articulated entity; wherein the mask token represents the second joint and is temporally adaptable by:

in response to receiving an indication that the second joint is unobserved, using information about the reference joint pose and a pose of the second joint from a previous time step; and in response to receiving an indication that the second joint is observed, using information about the reference joint pose and a pose of the second joint from the current time step.

Clause B. The method of clause A wherein the predicted pose comprises an orientation of the plurality of joints of the articulated entity and wherein the plurality of joints form a whole body of the articulated entity.

Clause C. The method of clause A or clause B wherein the reference joint pose and the indication of an unobserved joint are received from a head mounted display HMD worn by the articulated entity and the method operates in real time.

Clause D. The method of any preceding clause comprising using the predicted trajectory and the predicted pose of the articulated entity to do any of: animate an avatar representing the articulated entity, recognize gestures made by the articulated entity and/or control motion of the articulated entity.

Clause E. The method of any preceding clause comprising receiving an indication of that a third joint of the articulated entity is unobserved or observed;

prompting a trained generative motion model using the reference joint pose and the mask token and a second mask token to predict the trajectory of the articulated entity and the pose of the plurality of joints of the articulated entity; wherein the second mask token represents the third joint and is temporally adaptable by:

in response to receiving an indication that the third joint is unobserved, using information about the reference joint pose and a pose of the third joint from a previous time step; and in response to receiving an indication that the third joint is observed, using information about the reference joint pose and a pose of the third joint from the current time step.

Clause F. The method of any preceding clause wherein the mask token is computed in an embedding space of the trained generative motion model.

Clause G. The method of clause F wherein the mask token is predicted by a neural network having been trained to learn features that represent a future representation of the joint represented by the mask token.

Clause H. The method of any preceding clause further comprising:

receiving observations of poses of a plurality of joints of the articulated entity;

updating the predicted trajectory and the predicted pose using discrepancies between the observations and the predicted trajectory and pose.

Clause I. The method of clause H wherein the received observations comprise data from a motion sensor held by or mounted on the articulated entity and wherein the updating is done using an energy term which represents the discrepancies.

Clause J. The method of clause H wherein the received observations comprise intermittent observations of poses of one of the joints and wherein the updating is done using an energy term which reduces influence of discrepancies larger than a threshold.

Clause K. The method of any preceding clause wherein the model comprises an attention mechanism configured to encode information about the reference joint pose and the second joint over a plurality of the time steps, and to encode information about spatial correlations between the reference joint pose and the second joint.

Clause L. The method of clause K wherein the attention mechanism comprises a transformer.

Clause M. The method of clause K wherein the attention mechanism comprises a gated recurrent unit to encode information about the reference joint pose and a second gated recurrent unit to encode information about the second joint.

Clause N. The method of clause M comprising inputting encodings from the gated recurrent units to a transformer having a self-attention mechanism.

Clause O. An apparatus comprising a processor and a memory, the memory storing a trained generative motion model and instructions, which when executed by the processor cause the apparatus to: for each of a plurality of time steps:

receive a reference joint pose of an articulated entity;

receive an indication that a second joint of the articulated entity is unobserved or observed;

prompt a trained generative motion model using the reference joint pose and a mask token to predict body motion comprising a trajectory of the articulated entity and a pose of a plurality of joints of the articulated entity; wherein the mask token represents the second joint and is temporally adaptable by:

in response to receiving an indication that the second joint is unobserved, using information about the reference joint pose and a pose of the second joint from a previous time step; and in response to receiving an indication that the second joint is observed, using information about the reference joint pose and a pose of the second joint from the current time step.

Clause P. The apparatus of clause O which is a head mounted display HMD and wherein receiving the reference joint pose comprises computing the reference joint pose from sensor data captured by the HMD and receiving the indication comprises computing the indication from sensor data captured by the HMD, and wherein the articulated entity is a wearer of the HMD.

Clause Q. A method of training comprising:

accessing training data comprising a sequence comprising:

reference joint poses of an articulated entity, indications that a second joint of the articulated entity is unobserved or observed, and where the second joint is observed a pose of the second joint;

values of a trajectory of the articulated entity; and training, using supervised learning, a generative machine learning model to predict body motion comprising a trajectory of the articulated entity and a pose of a plurality of joints of the articulated entity, using the training data and a loss function;

wherein the loss function comprises a forecast loss term and a pose reconstruction term;

wherein the forecast loss term is a difference between a forecasted pose of the second joint for a next time step and an observation of the second joint in the next time step; and wherein the pose reconstruction term comprises a difference between the predicted trajectory and pose and corresponding ground truth values.

Clause R. The method of clause Q wherein the loss also comprises a loss in world space.

Clause S. The method of clause Q or clause R wherein the loss also comprises a term aiming to minimize difference between predicted joint transformations of all joints of the articulated entity and corresponding values known from the training data.

Clause T. The method of any one of clauses Q to S wherein the loss also comprises a term to penalize discrepancy between velocity of changes in the prediction and corresponding values from the training data.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer-implemented method comprising, for a time step in a plurality of time steps:

receiving a reference joint pose of an articulated entity;

receiving an indication that a second joint of the articulated entity is unobserved or observed; and prompting a trained generative motion model, using the reference joint pose and a mask token, to predict body motion comprising a trajectory of the articulated entity and a pose of a joint of a plurality of joints of the articulated entity, wherein the mask token is temporally adaptable to generate temporally coherent motion of the second joint by:

in response to receiving an indication that the second joint is unobserved, using information about the reference joint pose and a pose of the second joint from a previous time step, and in response to receiving an indication that the second joint is observed, using information about the reference joint pose and a pose of the second joint from a current time step.

2. The method of claim 1, wherein the predicted pose comprises an orientation of the plurality of joints of the articulated entity and wherein the plurality of joints form a whole body of the articulated entity.

3. The method of claim 1, wherein:
the reference joint pose and the indication that the second joint is unobserved are received from a head mounted display (HMD) being worn by the articulated entity, and
the method operates in real time.

4. The method of claim 1, further comprising using the trajectory and the reference joint pose of the articulated entity to:
animate an avatar representing the articulated entity,
recognize gestures made by the articulated entity, or
control motion of the articulated entity.

5. The method of claim 1, further comprising:
receiving an indication that a third joint of the articulated entity is unobserved or observed;
prompting a trained generative motion model using the reference joint pose and the mask token and a second mask token to predict the trajectory of the articulated entity and the pose of the plurality of joints of the articulated entity;
wherein the second mask token is temporally adaptable to generate temporally coherent motion of the third joint by:
in response to receiving an indication that the third joint is unobserved, using information about the reference joint pose and a pose of the third joint from a previous time step; and
in response to receiving an indication that the third joint is observed, using information about the reference joint pose and a pose of the third joint from the current time step.

6. The method of claim 1, wherein the mask token is computed in an embedding space of the trained generative motion model.

7. The method of claim 6, wherein the mask token is predicted by a neural network having been trained to learn features that represent a future representation of the joint represented by the mask token.

8. The method of claim 1, further comprising:
receiving observations of poses of a plurality of joints of the articulated entity; and
updating the predicted trajectory and the predicted pose using discrepancies between the observations and the predicted trajectory and pose.

9. The method of claim 8, wherein the received observations comprise data from a motion sensor held by or mounted on the articulated entity and wherein the updating is done using an energy term which represents the discrepancies.

10. The method of claim 8, wherein the received observations comprise intermittent observations of poses of one of the joints and wherein the updating is done using an energy term which reduces influence of discrepancies larger than a threshold.

11. The method of claim 1, wherein the trained generative motion model comprises an attention mechanism configured to encode information about the reference joint pose and the second joint over the plurality of time steps, and to encode information about spatial correlations between the reference joint pose and the second joint.

12. The method of claim 11, wherein the attention mechanism comprises a transformer.

13. The method of claim 11, wherein the attention mechanism comprises a first gated recurrent unit to encode information about the reference joint pose and a second gated recurrent unit to encode information about the second joint.

14. The method of claim 13, comprising inputting encodings from the first gated recurrent unit, the second gated recurrent unit, or both, to a transformer having a self-attention mechanism.

15. An apparatus comprising a processor and a memory, the memory storing a trained generative motion model and instructions, which when executed by the processor cause the apparatus to, for a time step in a plurality of time steps:
receive a reference joint pose of an articulated entity;
receive an indication that a second joint of the articulated entity is unobserved or observed; and
prompt a trained generative motion model, using the reference joint pose and a mask token, to predict body motion comprising a trajectory of the articulated entity and a pose of a joint of a plurality of joints of the articulated entity,
wherein the mask token is temporally adaptable to generate temporally coherent motion of the second joint by:
in response to receiving an indication that the second joint is unobserved, using information about the reference joint pose and a pose of the second joint from a previous time step; and
in response to receiving an indication that the second joint is observed, using information about the reference joint pose and a pose of the second joint from a current time step.

16. The apparatus of claim 15, further comprising a head mounted display (HMD), wherein the instructions further cause the apparatus to receive the reference joint pose by computing the reference joint pose from sensor data captured by the HMD;
wherein receiving the indication comprises computing the indication from sensor data captured by the HMD; and
wherein the articulated entity is a wearer of the HMD.

17. A non-transitory computer-readable media storing computer-readable instructions which, when executed by a processor, cause the processor to perform operations comprising:
receiving a reference joint pose of an articulated entity;
receiving an indication that a second joint of the articulated entity is unobserved or observed; and
prompting a trained generative motion model, using the reference joint pose and a mask token, to predict body motion comprising a trajectory of the articulated entity and a pose of a joint of a plurality of joints of the articulated entity,
wherein the mask token is temporally adaptable to generate temporally coherent motion of the second joint by:
in response to receiving an indication that the second joint is unobserved, using information about the reference joint pose and a pose of the second joint from a previous time step, and
in response to receiving an indication that the second joint is observed, using information about the reference joint pose and a pose of the second joint from a current time step.

18. The non-transitory computer-readable media of claim 17, wherein:
the predicted pose comprises an orientation of the plurality of joints of the articulated entity, and
the plurality of joints form a whole body of the articulated entity.

19. The non-transitory computer-readable media of claim 17, the operations further comprising:

receiving an indication that a third joint of the articulated entity is unobserved or observed;

prompting a trained generative motion model using the reference joint pose and the mask token and a second mask token to predict the trajectory of the articulated entity and the pose of the plurality of joints of the articulated entity;

wherein the second mask token is temporally adaptable to generate temporally coherent motion of the third joint by:

in response to receiving an indication that the third joint is unobserved, using information about the reference joint pose and a pose of the third joint from a previous time step; and in response to receiving an indication that the third joint is observed, using information about the reference joint pose and a pose of the third joint from the current time step.

20. The non-transitory computer-readable media of claim 17, wherein the mask token is computed in an embedding space of the trained generative motion model.

\* \* \* \* \*